US011001720B2

(12) United States Patent
Argoitia et al.

(10) Patent No.: US 11,001,720 B2
(45) Date of Patent: *May 11, 2021

(54) FLAKES WITH UNDULATE BORDERS AND METHODS OF FORMING THEREOF

(71) Applicant: VIAVI SOLUTIONS INC., San Jose, CA (US)

(72) Inventors: Alberto Argoitia, Santa Rosa, CA (US); Cornelis Jan Delst, Fairfax, CA (US); Laurence Holden, Cranbury, NJ (US)

(73) Assignee: VIAVI SOLUTIONS INC., San Jose, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 16/390,979

(22) Filed: Apr. 22, 2019

(65) Prior Publication Data

US 2019/0249013 A1 Aug. 15, 2019

Related U.S. Application Data

(60) Division of application No. 15/257,396, filed on Sep. 6, 2016, now Pat. No. 10,308,812, which is a division
(Continued)

(51) Int. Cl.
*B32B 5/16* (2006.01)
*C09D 7/61* (2018.01)
(Continued)

(52) U.S. Cl.
CPC ............... *C09D 7/61* (2018.01); *B82Y 30/00* (2013.01); *C09C 1/0015* (2013.01);
(Continued)

(58) Field of Classification Search
CPC ............... C09C 1/0015; C09C 1/0078; Y10T 428/2982
(Continued)

(56) References Cited

U.S. PATENT DOCUMENTS

3,692,731 A * 9/1972 McAdow ............... C08K 7/06
523/204
6,706,394 B2 * 3/2004 Kuehnle ............... A61K 9/5094
428/402
(Continued)

*Primary Examiner* — Hoa (Holly) Le
(74) *Attorney, Agent, or Firm* — Mannava & Kang, P.C.

(57) ABSTRACT

The invention provides a plurality of substantially same planar pigment flakes, each formed of one or more thin film layers. Each flake has a face surface and a flake border delimiting the face surface; the flake border undulates in the plane of the flake. The flakes have a pre-selected shape, may have a symbol or a grating thereon. A method of manufacturing of these flakes including the steps of: (a) providing a substrate having a plurality of one-flake regions and a plurality of depressions or protrusions disposed therebetween and not extending into the one-flake regions, (b) coating the substrate with a releasable coating, and (c) removing the releasable coating and breaking it into the flakes; wherein two adjacent of the one-flake regions are separated by at least three of the depressions or protrusions for facilitating the breaking of the releasable coating into the flakes.

22 Claims, 6 Drawing Sheets

Related U.S. Application Data of application No. 12/463,114, filed on May 8, 2009, now Pat. No. 9,458,324, and a continuation-in-part of application No. 11/243,122, filed on Oct. 4, 2005, now Pat. No. 7,645,510, and a continuation-in-part of application No. 10/762,158, filed on Jan. 20, 2004, now Pat. No. 7,241,489, and a continuation-in-part of application No. 10/641,695, filed on Aug. 14, 2003, now Pat. No. 7,258,915, and a continuation-in-part of application No. 10/243,111, filed on Sep. 13, 2002, now Pat. No. 6,902,807.

(60) Provisional application No. 61/051,463, filed on May 8, 2008, provisional application No. 60/696,593, filed on Jul. 5, 2005.

(51) Int. Cl.
*C09C 1/00* (2006.01)
*B82Y 30/00* (2011.01)
*C09D 7/40* (2018.01)
*G02B 5/18* (2006.01)

(52) U.S. Cl.
CPC .......... *C09C 1/0018* (2013.01); *C09C 1/0078* (2013.01); *C09D 7/70* (2018.01); *G02B 5/18* (2013.01); *G02B 5/1847* (2013.01); *C01P 2004/20* (2013.01); *C01P 2004/22* (2013.01); *C01P 2004/64* (2013.01); *C01P 2006/60* (2013.01); *Y10T 428/24612* (2015.01); *Y10T 428/25* (2015.01); *Y10T 428/2982* (2015.01)

(58) Field of Classification Search
USPC ......................................................... 428/402
See application file for complete search history.

(56) References Cited

U.S. PATENT DOCUMENTS 9,458,324 B2 * 10/2016 Argoitia ................. B82Y 30/00
10,308,812 B2 * 6/2019 Argoitia ................. B82Y 30/00

\* cited by examiner

FIG. 9 ial patent application No. 61/051,463 filed May 8, 2008,
FLAKES WITH UNDULATE BORDERS AND METHODS OF FORMING THEREOF

CROSS-REFERENCE TO RELATED APPLICATIONS

This patent application is a Divisional of commonly assigned and co-pending U.S. patent application Ser. No. 15/257,396, filed Sep. 6, 2016 (allowed), which claims priority to the following patents: U.S. Pat. No. 9,458,324, filed on May 8, 2009, which is a continuation-in-part of U.S. Pat. No. 7,645,510, filed on Oct. 4, 2005, which is a continuation-in-part of U.S. Pat. No. 7,241,489, filed on Jan. 20, 2004, which is a continuation-in-part of U.S. Pat. No. 7,258,915, filed on Aug. 14, 2003, and also is a continuation-in-part of U.S. Pat. No. 6,902,807, filed on Sep. 13, 2002, the disclosures of which are incorporated herein by reference for all purposes. U.S. Pat. No. 7,645,510 also claims priority from U.S. provisional patent application No. 60/696,593 filed Jul. 5, 2005, which is incorporated herein by reference. The present application claims priority from U.S. provisional patent application No. 61/051,463 filed May 8, 2008, which is incorporated herein by reference for all purposes.

TECHNICAL FIELD

The present invention relates generally to thin-film pigment flakes, and more particularly to a method of manufacturing of shaped flakes.

BACKGROUND OF THE INVENTION

Specialty pigments are used in a variety of security applications, such as anti-counterfeiting devices printed on banknotes, packaging of high-value items, seals for containers, etc. One type of specialty pigments is color-shifting flakes used in special-effect inks. The color-shifting flakes are manufactured by deposition of several layers of various materials onto a substrate and then breaking the deposited coating into single flakes. This method results in irregularly-shaped pigment flakes.

Alternatively, flakes of a particular shape provide a security feature which is visible only under magnification. Additionally, shaped flakes may be used for coding of security inks or any other objects. Another anti-counterfeiting approach uses microscopic symbols, for example, embossed on the pigment flakes. A combination of the above features may be used in the same flakes for enhanced security.

SUMMARY OF THE INVENTION

The invention relates to a method of manufacturing of pigment flakes including the steps of: (a) providing a substrate having a plurality of one-flake regions and a plurality of depressions or protrusions disposed therebetween and not extending into the one-flake regions, (b) coating the substrate with a releasable coating, and (c) removing the releasable coating and breaking it into the flakes; wherein two adjacent of the one-flake regions are separated by at least three of the depressions or protrusions for facilitating the breaking of the releasable coating into the flakes.

The invention provides a plurality of substantially same planar pigment flakes. Each flake includes one or more thin film layers and has a face surface and a flake border delimiting the face surface. A diameter of the face surface is less than 100 microns and a thickness of the flake is less than 4 microns; the flake border undulates in the plane of the flake.

Another aspect of the present invention relates to a method of manufacturing of pigment flakes wherein a substrate has polygon-shaped one-flake regions with a number of sides between 3 and 6, and one or two rows of depressions or protrusions between two adjacent one-flake regions for forming a perforation line. The number of the depressions or protrusions per one side of the polygon-shaped one-flake regions is between 7 and 20.

The invention further provides a plurality of substantially same planar pigment flakes, wherein the each flake includes one or more thin film layers and has a face surface and a flake border delimiting the face surface. A diameter of the face surface is less than 100 microns and a thickness of the flake is less than 4 microns. Each flake has a square shape with at least three sides thereof being undulate lines in the plane of the flake, wherein each line undulates periodically and has a number of waves between 8 and 20 per side of the polygon.

Another feature of the present invention provides shaped pigment flakes with a symbol thereon and an undulate border. The invention provides a method of forming such flakes using a substrate with same-shaped one-flake regions separated by depressions or protrusions for facilitating breakage of the flakes along the undulate lines; the one-flake regions have the symbols formed therein.

Yet another aspect of this invention provides shaped grated flakes as well as a method of forming such flakes using a substrate with polygon-shaped one-flake regions which have grooves or ridges for providing a grating to the flakes, wherein the grooves or ridges of a first one-flake region are separated from the grooves or ridges of a second one-flake region by one or two rows of depressions or protrusions.

The invention also provides a sheet of one-flake regions, for forming the flakes defined in claim 1. The sheet has (a) a substrate having the one-flake regions and a plurality of depressions or protrusions disposed therebetween and not extending into the one-flake regions, and (b) a releasable coating coated onto the substrate, wherein a diameter of the one-flake regions is less than 100 microns and stripes of depressions and protrusions between two of the one-flake regions have a width of less than 20% of the diameter, and wherein two adjacent of the one-flake regions are separated by at least three of the depressions or protrusions for facilitating the breaking of the releasable coating into the flakes, so that breakage is likely to occur about the depressions or protrusions, when the releasable coating is separated into the flakes.

According to the invention, a plurality of substantially same pigment flakes is provided, wherein each flake has one or more thin film layers, a diameter of the flake is between 2 and 100 microns, and a thickness of the flake is less than 50% of the flake diameter, the flake border is an undulate line in the plane of the flake and has at least four waves per side of the flake.

BRIEF DESCRIPTION OF THE DRAWINGS

The invention will be described in greater detail with reference to the accompanying drawings, wherein.

DETAILED DESCRIPTION

Figure 1:
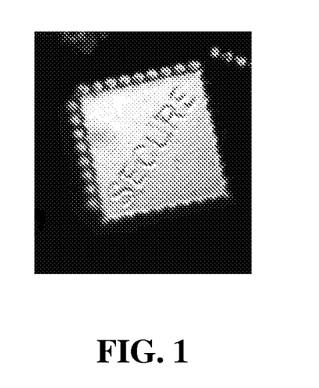
FIG. 1 is a micro photograph of a flake in accordance with the invention.

The method described below provides pigment flakes with a postage stamp-like edge for easy severing along the designated lines during the manufacturing process. The perforation is enabled by using a particular structured deposition substrate which has teeth (protrusions) or holes (depressions) between one-flake regions. Portions of the flake material deposited into the holes or on top of the teeth easily break from the flake portions and from each other, thus creating flakes of a desired shape and debris fragments of a significantly size smaller than the flakes. FIG. 1 illustrates such a flake; small debris fragments are visible in the top right corner of the picture.

Figure 2:
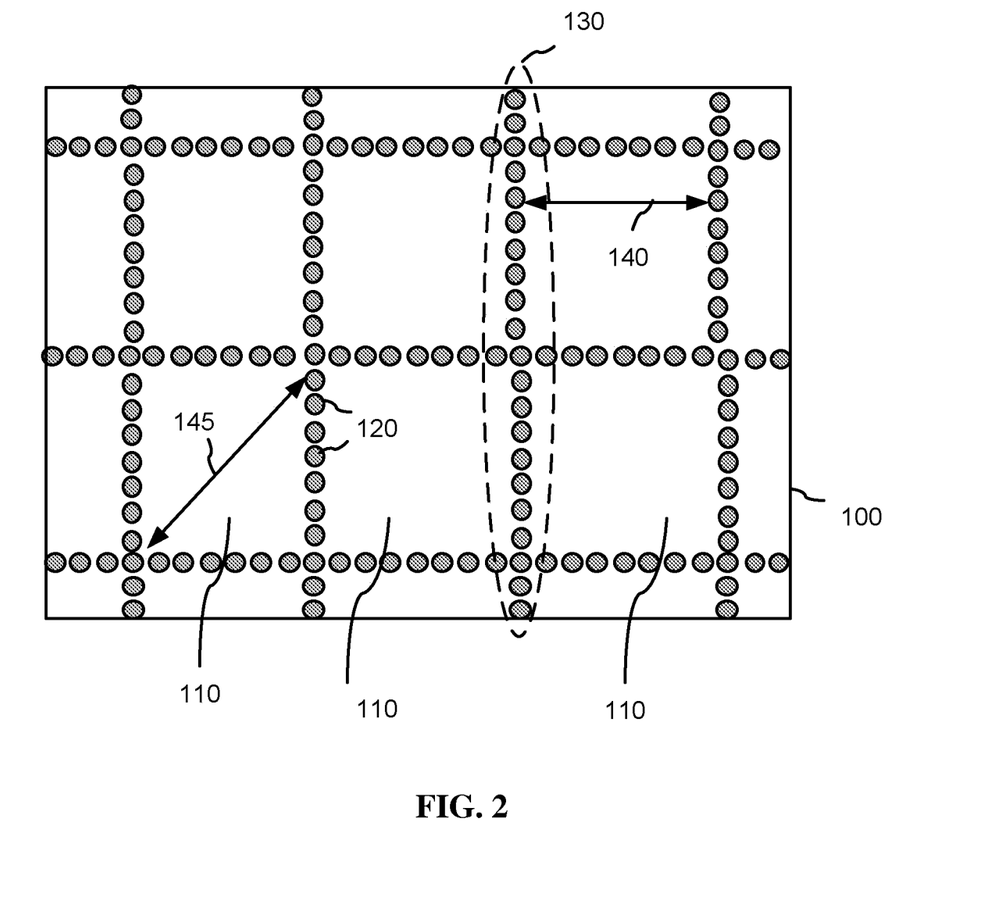
FIG. 2 is a schematic plan view of a deposition substrate in accordance with one embodiment of the invention.

With reference to FIG. 2, a substrate 100 has a plurality of one-flake regions 110 and depressions or protrusions 120 disposed between the one-flake regions 110. The substrate 100 is designed for manufacturing of postage-stamp shaped flakes, wherein perforation between the flakes is formed by the depressions or protrusions 120.

The one-flake regions 110 have a shape selected for the flakes being manufactured. FIG. 2 shows the one-flake regions 110 to have a square shape; however, they may have other shapes, such as a circle or a polygon with 3 or 6 sides. The largest dimension of the one-flake region 110, a diameter 145, depends on the desired flake size, and is greater than 2 and less than 100 microns.

A strip of depressions and protrusions 120 between two of the one-flake regions 110 have a width of less than 20% of the diameter 145. In FIG. 2, the depressions or protrusions 120 form rows 130 so that one row 130 separates a pair of adjacent one-flake regions 110.

Breaking features 120 may be either depressions, or protrusions, or a mixture thereof. The depressions and protrusions 120 may be from 100 nm to 2000 nm deep or high, respectively.

The density of the depressions or protrusions 120 depends on the flake size; two adjacent one-flake regions 110 are separated by at least three depressions or protrusions 120 for facilitating the breaking of the releasable coating into the flakes. Preferably, the substrate 100 has from 7 to 20 depressions/protrusions 120 per a flake side.

By way of example, a substrate for manufacturing of 2×2 microns flakes has the depressions/protrusions 120 of about 0.1-0.2 microns in diameter, and a substrate for manufacturing of 25×25 microns flakes has the depressions/protrusions 120 of about 1.5-2.5 microns in diameter.

Figure 6A:
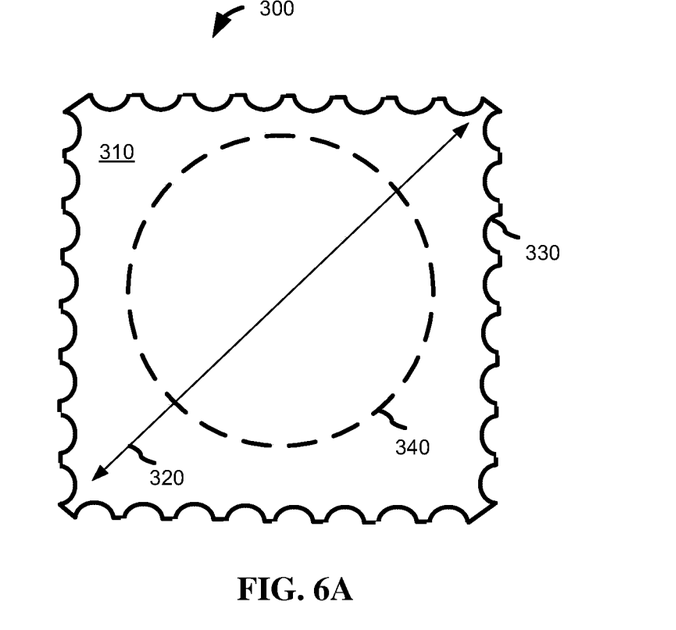
FIG. 6A is a schematic plan view of a pigment flake.
Figure 6B:
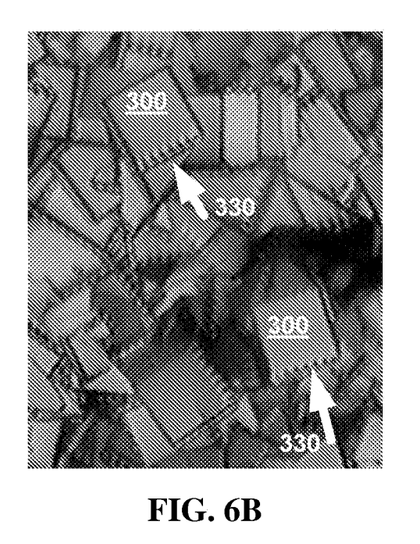
FIG. 6B is a micro photograph of flakes with undulate borders.

In another example, for manufacturing of 15×15 microns square-shaped flakes shown in FIG. 6B, a substrate has a distance 140 between two neighboring strips of the depressions/protrusions 120, which are represented by rows 130, equal to 15 microns; the rows 130 include 7 holes per a 15-microns interval thus causing a side of the flake to have 7 waves.

The depressions and protrusions 120 are preferably round in the plane of the substrate so as to minimize the size of debris fragments for a given separation of the flakes; however the depressions/protrusions 120 may have any shape.

The depressions or protrusions 120 may be directly adjacent to one another or separated by an isthmus so as to guarantee separation of the debris into the smallest fragments when the flakes are released from the substrate.

Figure 3:
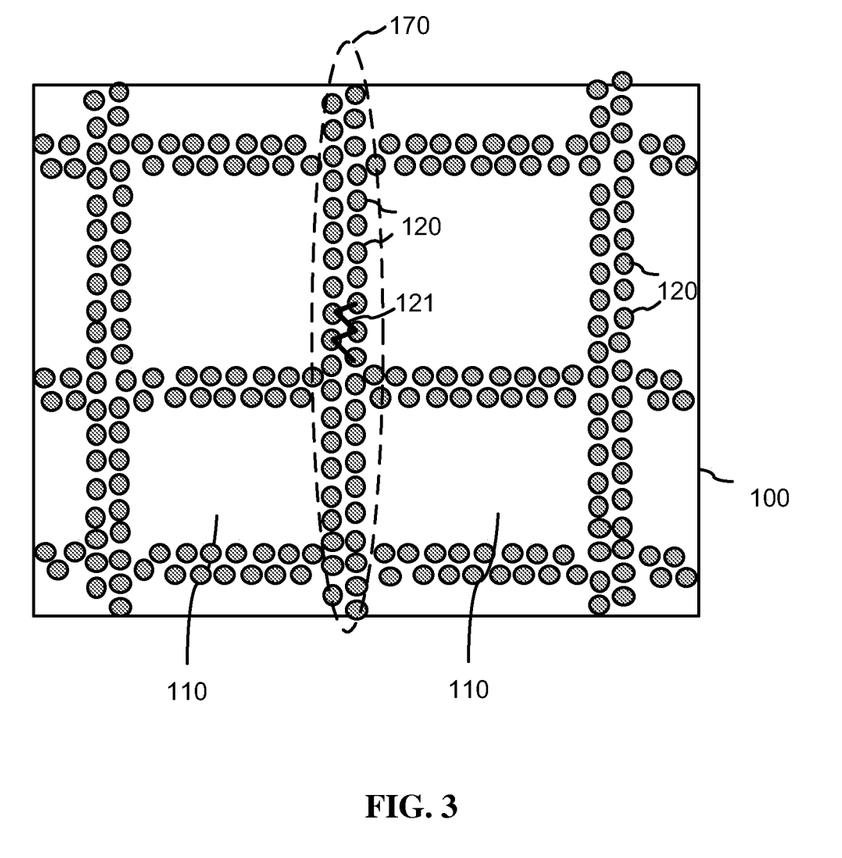
FIG. 3 is a schematic plan view in accordance with one embodiment of the invention.

With reference to FIG. 3, the depressions/protrusions 120 between two one-flake regions 110 may be arranged in a zigzag pattern 121 forming two rows 170 to ensure better separation of the debris fragments associated with single depressions or protrusions 120.

Figure 4:
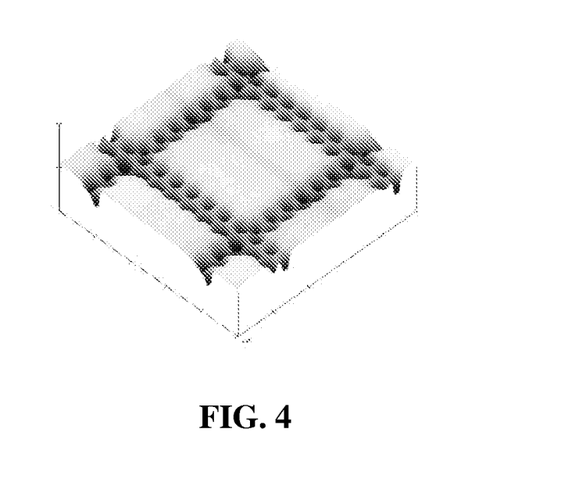
FIG. 4 is a perspective view of the substrate shown in FIG. 3.

By way of example, FIG. 4 is a microphotograph of a portion of a substrate with two rows of depressions arranged in the zigzag pattern. The substrate is made by embossing a plastic film with a nickel shim.

Since the depressions or protrusions 120 are for breaking the one-flake regions 110 from one another, the depressions or protrusions 120 are not extending into the one-flake regions 110.

Figure 5A:
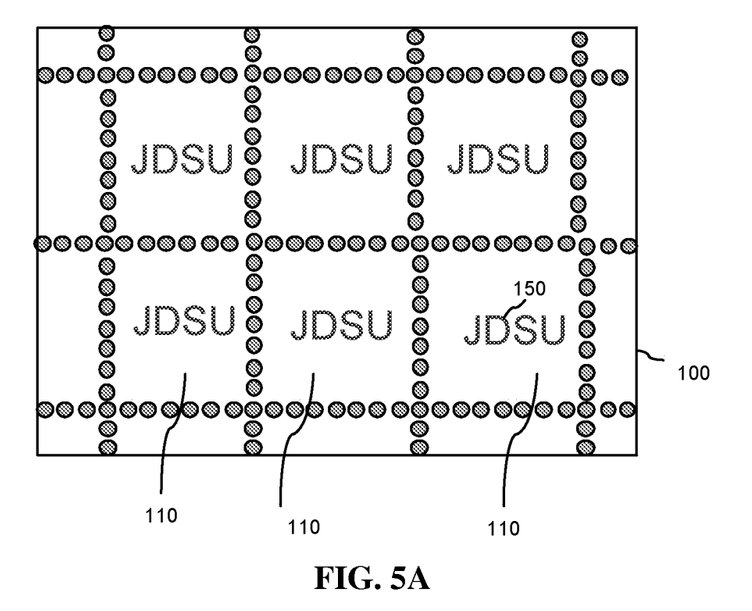
FIG. 5A is a schematic plan view of a deposition substrate for manufacturing flakes with symbols.

With reference to FIG. 5A, the one-flake regions 110 may have one or more symbols 150 embossed in the surface of the substrate 100 or protruding therefrom. The symbols 150 are understood to include alpha-numeric symbols, as well as logos, barcodes, etc.

Figure 5B:
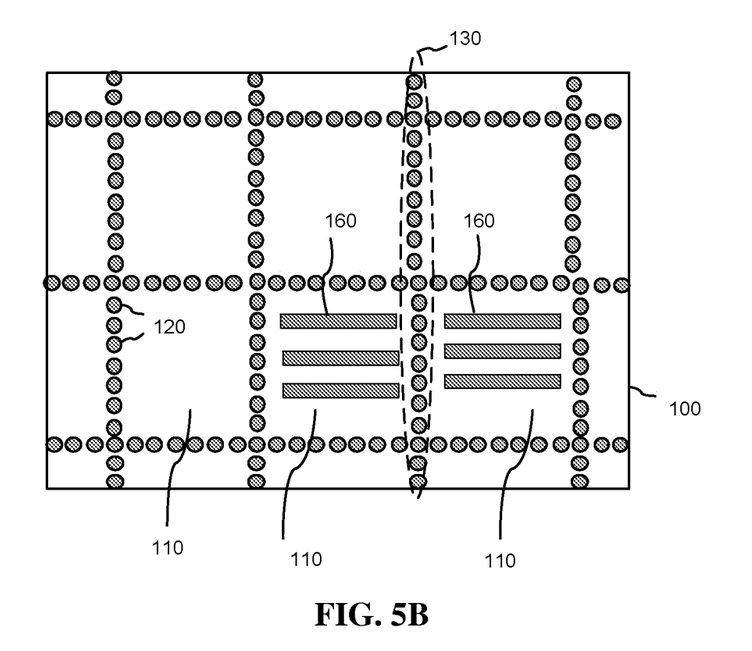
FIG. 5B is a schematic plan view of a deposition substrate for manufacturing grated flakes.

With reference to FIG. 5B, the one-flake regions 110 may have grooves or ridges 160 for providing a grating structure to the flakes. The grooves or ridges 160 extend through the one-flake region 110 and the grooves or ridges 160 of one region 110 are separated from the grooves or ridges of another region 100 by a row of the depressions or protrusions 120, or by two rows, or by a strip of irregularly positioned depressions or protrusions 120. The grooves or ridges 160 may be spatially separated from the depressions or protrusions 120 by isthmuses as shown in FIG. 5B, or be in direct contact with the depressions or protrusions 120. The grooves or ridges 160 have a frequency in the range of from 100 to 5000 lines/mm.

Alternatively, the substrate 100 shown in FIG. 5B may have only the rows of the depressions or protrusions 120 which are orthogonal to the grooves or ridges 160. In that case, the releasable coating would break along the grooves or ridges 160 in one direction and along the rows 130 in another direction.

Deposition of a releasable coating onto the substrate 100 shown in FIG. 5B, subsequent removal of the coating and its breakage about the depressions/protrusions 120, result in diffractive flakes having a same pre-selected shape. Such flakes have their borders undulate in the plane of the flake, whereas conventional diffractive flakes, broken across their grooves, have an irregular shape and a flake border undulate up-and-down relative to the plane of the flake.

For the diffractive flakes, as well as for all the flakes of the instant invention, the in-plane undulate flake border is a result of the novel manufacturing process, which provides flakes of a preselected shape with very low quantity of debris and debris fragments of a smaller size than other methods. Additionally, the in-plane undulate flake borders provide a security feature, which is difficult to counterfeit and simple to detect.

The substrate 100 may be formed of any material; however, plastic substrates, e.g. formed of polyethylene terephthalate (PET), are preferable.

The origination of the master for the fabrication of surface-relief microstructures for the structured substrate 100 may be fabricated using known techniques, such as laser writing, e-beam writing, diamond scribing, masking, etc. The methods of laser and e-beam direct writing are better suited when a fine microstructure is desired. After the original master is originated, a nickel shim is electroformed and recombined to get the final production Ni shim to a size desired in production. The nickel shim may be used in any of high resolution replication technologies, such as hot stamping, embossing, hot-roller embossing, injection-molding, UV casting-embossing, etc. In mass production of pigment flakes, the embossed substrate is a long roll of plastic foil, and the replication technology is UV casting or pressure/temperature embossing.

In the process of flake manufacturing, the substrate 100 is coated with one or more thin film layers forming a releasable coating. Usually a first layer of the releasable coating is a release layer, by way of example, made of a water-soluble material. In some cases, the microstructured layer itself can be soluble so that the release layer is not necessary.

A roll coater is one type of apparatus, which may be used to produce flakes according to embodiments of the invention. A roll of polymer substrate material is passed through a deposition zone(s) and coated with one or more thin film layers, which are typically 50 to 3000 nm thick layers of inorganic material; however organic layers also may be present. Multiple passes of the roll of polymer substrate back and forth through the deposition zone(s) may be made. Known deposition techniques include variations of chemical vapor deposition (CVD) and physical vapor deposition (PVD) methods. The releasable coating is then removed from the polymer substrate and broken into flakes. In more detail this process is described in U.S. Pat. No. 5,059,245, incorporated herein by reference.

By way of example, the releasable coating includes a reflector layer, an absorber layer, and a spacer layer therebetween, for manufacturing of color-shifting pigment flakes. Preferable materials are Aluminum, $MgF_2$, and Chromium as described in the U.S. Pat. No. 5,059,245. Alternatively, the releasable coating is formed of one or more transparent or semi-transparent materials for manufacturing covert flakes for security applications as described in U.S. Pat. No. 7,258,915, incorporated herein by reference. Further, the releasable coating may include a metal layer for providing bright reflective flakes and/or a layer of magnetic material for orientation of the flakes in a magnetic field as described in U.S. Pat. No. 6,150,022, incorporated herein by reference. The releasable coating has a thickness in the range of from 100 nm to 4000 nm.

The substrate 100 has a microstructure that facilitates breaking of the flakes in specific shapes during the post-processing steps. These steps include stripping off the coating from the substrate 100 and grinding/sizing the stripped material. Also, in the printing application, some of the printing processes include the application of forces that tend to further break the flakes from each other.

One of the flakes manufactured as described above is schematically shown in FIG. 6A. The flake 300 has a face surface 310 and a flake border 330, which delimits the face surface 310. The flake 300 is formed of the one or more thin film layers discussed above. A diameter 320 of the face surface 310 is less than 100 microns which corresponds to the diameter 145 of the one-flake region 110 shown in FIGS. 2, 3, 5A and 5B. A thickness of the flake 300 is less than 50% of the diameter 320 so as to ensure planar characteristics of the flake. The flake 300 has a planar central region 340.

By way of example, FIG. 6B is a microphotograph of flakes similar to the flake 300 shown in FIG. 6A. The square flakes shown in FIG. 6B have a flake border with 7 waves per 15-microns side of the square.

Figure 7:
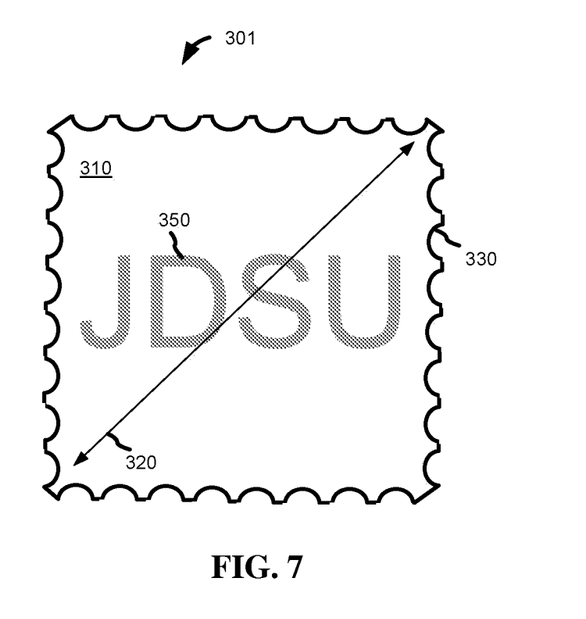
FIG. 7 is a schematic plan view of a pigment flake with a symbol.

Optionally, the flake 300, shown as flake 301 in FIG. 7, has one or more symbols 350 thereon, which correspond to the symbols 150 on the substrate 100 shown in FIG. 5A.

Figure 8:
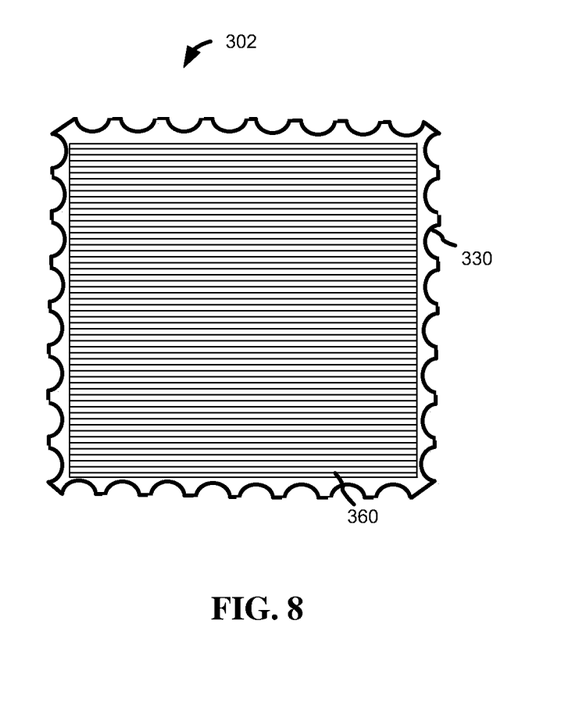
FIG. 8 is a schematic plan view of a pigment flake with a diffraction grating; and, FIG. 9 is a perspective view of a sheet of one-flake regions forming flakes with undulate borders.

Optionally, the flake 300, shown as flake 302 in FIG. 8, has a diffraction grating 360 formed on the grooves or ridges 160 of the substrate 100 shown in FIG. 5B. It should be noted that the grating 360 and the grooves or ridges 160 are depicted not to scale for illustration purposes.

According to the instant invention, the flake border 330 shown in FIGS. 6-8 undulates in the plane of the flake.

The shaped pigment flakes of the instant invention, such as shown in FIGS. 1, 6A, 6B, 7 and 8, may be color-shifting flakes, bright reflective flakes, transparent or semi-transparent flakes, may include a magnetic material and/or have symbols thereon; the flakes may include multiple layers or be single-layer flakes, e.g. made of a metal or a transparent material. The flakes of the instant invention have a diameter between 2 and 100 microns and a thickness of from 100 nm to 4000 nm. The aspect ratio of flake diameter to flake thickness is at least 2 to 1 and preferably higher.

The pigment flakes formed by the method of the instant invention may have any preselected shape; however the polygon shapes are preferred because of easier perforation along the straight lines. Since at least some of the sides of the flakes are not straight but wavy (undulate) lines, the shape of the flakes is better described as a substantially polygonal shape.

The preferable number of sides in the polygon-shaped flakes is 3, 4 or 6, in order to ensure full utilization of the substrate surface. Preferably all the sides of the flakes are undulate lines; it is desirable for flakes to have at least three undulate sides.

Figure 9:
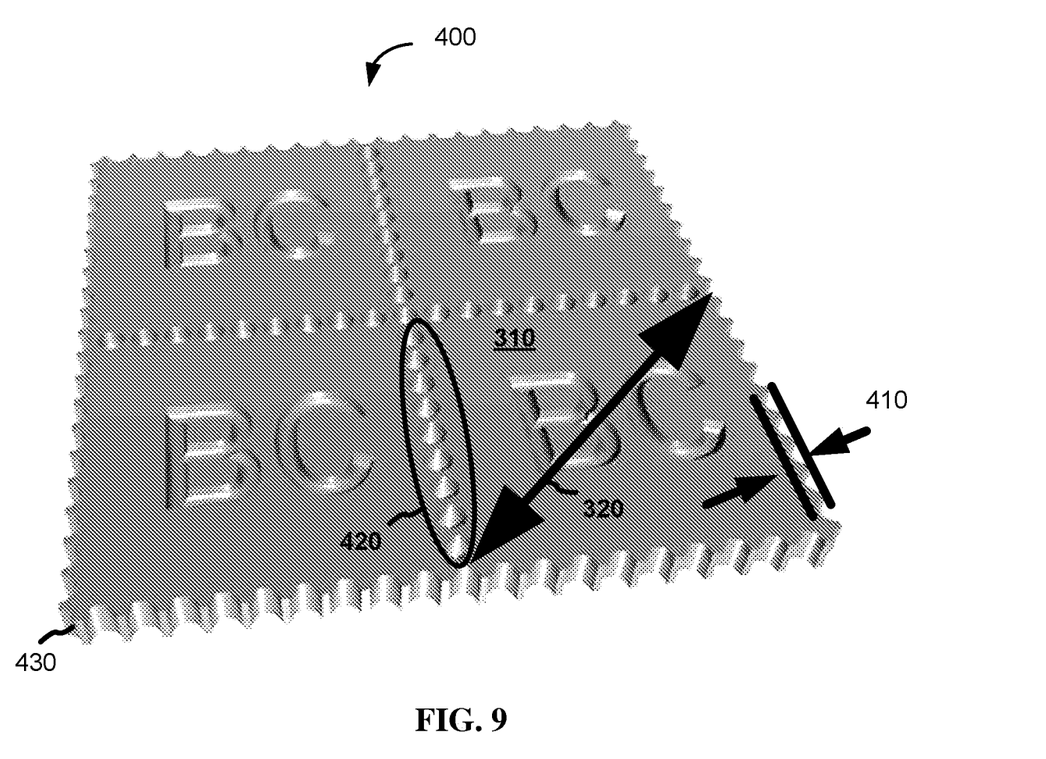

In one embodiment, at least a portion of the flake border 330 undulates periodically and has at least four waves. With reference to FIG. 9, an amplitude 410 of the waves is less than 20% of the diameter 320 of the face surface 310.

In practice, the undulate flake border is not necessarily an ideal postage-stamp-like border as shown e.g. in FIG. 6A. Some of the debris formed over the depressions or protrusions 120 may be still attached to the flake as it is shown in FIG. 1; all the border of the flake shown in FIG. 1 is an undulate line.

FIG. 9 shows a sheet 400 of one-flake regions 310 for forming the flakes 300, 301, or 302. The sheet 400 includes the substrate 100, not shown in FIG. 9, but shown in FIGS. 2-5B. Supported by the substrate 100 is a releasable coating 430 formed of the one or more thin film layers described above. The structural features of the substrate 100 are replicated in the coating 430. The substrate 100 and the coating 430 have the one-flake regions 110/310 and the depressions or protrusions 120 disposed therebetween and not extending into the one-flake regions 110/310. The diameter 145/320 of the one-flake regions is in the range of from 2 to 100 microns; and stripes 420 of the depressions or protrusions 120 between two of the one-flake regions 110/310 have a width of less than 20% of the diameter 145/320. Two adjacent one-flake regions 110/310 are separated by at least three depressions or protrusions 120 for facilitating the breakage of the releasable coating 430 into the flakes 300, 301 or 302, so that breakage is likely to occur about the depressions or protrusions 120, when the releasable coating 430 is separated into the flakes. At least some of the one-flake regions 110/310 may have symbols 150/350 or diffraction grating 160/360. The coating 430 may be the color-shifting coating or any other coating described above.

Advantageously, the method of the instant invention creates less debris and of a smaller size than other known methods. The debris are less visually apparent and less likely to be mistaken for broken flakes because of the size difference. Further, the undulate borders of the flakes make counterfeiting more difficult and provide an additional product-authentication feature.

The shaped flakes can have other than optical applications. For example, specifically shaped thin flakes can carry drugs, e.g. by inhalation, to a particular part of the body; considering that a 8 micron shaped flake has dimensions close to those of blood cells. Alternatively, specifically microstructured shapes and the materials applied can be engineered to have high surface areas for catalysis purposes.

We claim:

1. A plurality of flakes comprising,
   each flake in the plurality of flakes has one or more thin film layers;
   a diameter of each flake is from about 2 to about 100 microns;
   a thickness of each flake is less than about 50% of the diameter; and
   a flake border of each flake is an undulate line in a plane of the flake and has at least four waves per side of the flake.

2. The plurality of flakes of claim 1, wherein each flake includes grooves or ridges that extend across each flake.

3. The plurality of flakes of claim 2, wherein the grooves or ridges are in direct contact with depressions or protrusions present along an edge of each flake.

4. The plurality of flakes of claim 3, wherein a frequency of the grooves or ridges is the same or different as a frequency of the depressions or protrusions.

5. A sheet of one-flake regions comprising:
   (a) a substrate having the one-flake regions and a plurality of depressions or protrusions disposed therebetween and not extending into the one-flake regions, and
   (b) a releasable coating coated onto the substrate,
   wherein a diameter of the one-flake regions is less than 100 microns and stripes of depressions and protrusions between two of the one-flake regions have a width of less than 20% of the diameter, and
   wherein two adjacent of the one-flake regions are separated by at least three of the depressions or protrusions for facilitating the breaking of the releasable coating into the flakes, so that breakage is likely to occur about the depressions or protrusions, when the releasable coating is separated into the flakes.

6. The sheet as defined in claim 5, wherein the one-flake regions have a shape chosen from a circle, a polygon with 3 sides, a polygon with 4 sides, and a polygon with 6 sides.

7. The sheet as defined in claim 5, wherein the depressions or protrusions form rows so that one row separates a pair of adjacent one-flake regions.

8. The sheet as defined in claim 5, wherein the depressions or protrusions may be from 100 nm to 2000 nm deep or high.

9. The sheet as defined in claim 5, wherein the substrate has from about 7 to about 20 depressions per a flake side.

10. The sheet as defined in claim 5, wherein the one-flake region is 2×2 microns with depressions or protrusion of about 0.1 to about 0.2 microns in diameter.

11. The sheet as defined in claim 5, wherein the one-flake region is 25×25 microns with depressions or protrusion of about 1.5 to about 2.5 microns in diameter.

12. The sheet as defined in claim 5, wherein the depressions or protrusions are round in a plane of the substrate.

13. The sheet as defined in claim 5, wherein each one-flake region has a grating separated from a grating of another one-flake region.

14. The sheet as defined in claim 13, wherein the grating has a frequency in the range of from about 100 to about 5000 lines/mm.

15. The sheet as defined in claim 5, wherein the releasable coating is a color-shifting coating.

16. The sheet as defined in claim 5, wherein at least some of the plurality of one-flake regions comprise symbols embossed in a surface of the substrate.

17. The sheet of claim 5, wherein the one-flake regions include grooves or ridges that extend across; and wherein the plurality of depressions or protrusions is a strip of irregularly positioned depressions or protrusions disposed between the one-flake regions including grooves or ridges.

18. The sheet of claim 5, wherein the one-flake regions include grooves or ridges that extend across; and wherein the plurality of depressions or protrusions is a strip of depressions or protrusions including two or more rows; wherein the two or more rows are offset one from another.

19. A sheet of regions comprising:
   (a) a substrate having a plurality of regions and a plurality of depressions or protrusions disposed there between and not extending into the plurality of regions, and
   (b) a releasable coating coated onto the substrate,
   wherein the plurality of regions include a diameter that is less than about 100 microns and the depressions or protrusions include strips configured between two of the plurality of regions have a width of less than 20% of the diameter.

20. The sheet of claim 19, wherein two adjacent regions of the substrate are separated by at least three of the depressions or protrusions.

21. A method of manufacturing of pigment flakes comprising the steps of:
   (a) obtaining the sheet of regions of claim 19;
   (b) removing the releasable coating and breaking at least a portion of the releasable coating into the flakes;
   wherein two adjacent regions of the plurality of regions are separated by at least three of the depressions or protrusions.

22. The method of claim 21, further comprising grinding the removed releasable coating.

* * * * *